United States Patent
Perez Perez et al.

(10) Patent No.: US 9,110,632 B2
(45) Date of Patent: Aug. 18, 2015

(54) PORTABLE DEVICE CAPTURE

(71) Applicant: International Business Machines Corporation, Armonk, NY (US)

(72) Inventors: Heblem S. Perez Perez, Tlaquepaque (MX); Gabriel Ruelas Arana, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 14/017,820

(22) Filed: Sep. 4, 2013

(65) Prior Publication Data

US 2014/0146457 A1    May 29, 2014

(30) Foreign Application Priority Data

Nov. 23, 2012  (CA) .................................... 2796510

(51) Int. Cl.
*G06F 1/16*    (2006.01)

(52) U.S. Cl.
CPC ............ *G06F 1/1656* (2013.01); *G06F 1/1658* (2013.01); *G06F 1/1679* (2013.01)

(58) Field of Classification Search
USPC ............. 455/575.8, 418, 556.1, 550.1, 575.1, 455/575.4, 572, 575.3, 569.1; 345/173, 345/175, 174, 158, 177, 156, 619, 629; 361/679.55, 679.4, 679.08, 679.01, 361/679.42, 679.27, 679.2, 679.02, 679.31; 312/223.2, 215, 216, 219, 221, 217, 312/218, 257.1, 263; 16/236, 239, 352, 16/284, 344, 49, 94 R, 93 R, 370; 439/527, 439/218, 587, 640, 358
See application file for complete search history.

(56) References Cited

U.S. PATENT DOCUMENTS

| | | | |
|---|---|---|---|
| 5,026,298 A * | 6/1991 | Brussalis et al. | 439/358 |
| 7,255,582 B1 | 8/2007 | Liao | |
| 7,484,991 B1 | 2/2009 | Kelaher et al. | |
| 7,578,691 B2 | 8/2009 | Weksler et al. | |
| 7,980,867 B2 | 7/2011 | Dei Rossi et al. | |
| 2004/0074264 A1 | 4/2004 | Kung et al. | |
| 2005/0105261 A1 | 5/2005 | Bhogal | |
| 2006/0036872 A1 | 2/2006 | Yen | |
| 2007/0247800 A1 * | 10/2007 | Smith et al. | 361/683 |

(Continued)

OTHER PUBLICATIONS

"An External Hard Drive That Hangs in Place—Internet Siao". [internet] [Retrieved on: Aug. 16, 2013]. ,http://internetsiao.com/an-external-hard-drive-that-hangs-in-place/.

*Primary Examiner* — Hung Duong
(74) *Attorney, Agent, or Firm* — Daniel R. Simek; David J. Zwick (57) ABSTRACT

An illustrative embodiment of an apparatus for containing a set of portable devices comprises a primary bar affixed to a surface of a portable computing device; a secondary bar parallel to and spaced apart from the primary bar; a first tertiary bar; and a second tertiary bar, and wherein a combination of the primary bar, the secondary bar, the first tertiary bar and the second tertiary bar are configured to form a rectangular bounding box for containing one or more portable devices; and a set of slide slats spanning a distance between the primary bar and to the secondary bar, wherein each slat is parallel to and spaced apart from an adjacent slat in the set of slide slats and wherein the set of slide slats are located overhead of the one or more portable devices to contain the one or more portable devices within the bounding box.

7 Claims, 6 Drawing Sheets

(56) References Cited

U.S. PATENT DOCUMENTS

| | | |
|---|---|---|
| 2011/0019360 A1 | 1/2011 | Thabit |
| 2011/0191864 A1 | 8/2011 | Nagamura et al. |
| 2014/0073191 A1* | 3/2014 | Colahan et al. ............... 439/640 |
| 2014/0204529 A1* | 7/2014 | White et al. ............. 361/679.55 |

* cited by examiner

PORTABLE DEVICE CAPTURE

FIELD OF THE INVENTION

This disclosure relates generally to securing a portable device in a data processing system and more specifically to capturing one or more devices used with a portable computing device in the data processing system.

CROSS-REFERENCE TO RELATED APPLICATIONS

This application claims priority under 35 U.S.C. §119 to Canadian Patent Application Serial No. 2796510, filed Nov. 23, 2012, the entire contents of which are incorporated herein by reference.

BACKGROUND OF THE INVENTION

Plug and play characteristics of portable storage devices (e.g., universal serial bus (USB) attached devices) enables users to be more productive because the devices are typically easily attached and removed with minimum user interaction to configure the devices. However, situations exist where the easy to use feature of attached USB devices has negatively affected security and mobility.

In one example, when using USB drives in a non-secure environment, users of the device need to have some manner of securing the devices from loss or inadvertent use. In another example, a user may need to continue using the attached USB devices while the user is mobile. In another example, a storage device may be inadvertently removed while computer implemented applications continue to rely on the content of the storage device.

In the described examples, device removal or mobility inhibitors can have a negative impact on user productivity because all devices cannot remain connected. These situations typically lead to loss of data. Current and proposed solutions attempt to address the problems of the examples. One solution uses cables, which typically lead to a mobility problem when adding several devices, and fails to provide secure attachment of the particular devices. Further the proposed solutions do not prevent the attached USB devices from being accidentally disconnected.

While USB devices are used in the example, other removable compact storage devices also have similar issues. The issues are not specific to the USB connections; rather the issues are associated with the removable characteristics of the portable attachable storage devices.

SUMMARY

According to one embodiment, an apparatus for containing a set of portable devices comprises a primary bar affixed to a surface of a portable computing device adjacent and parallel to a first edge of the computing device; a secondary bar parallel to and spaced apart from the primary bar, wherein the secondary bar is moveable in a linear distance relative to the primary bar; a first tertiary bar, wherein a first end abuts the primary bar and a distal end is nearer a second edge of the portable computing device; a second tertiary bar, wherein the second tertiary bar is parallel to and spaced apart from the first tertiary bar, wherein a first end of the second tertiary bar abuts the primary bar and a distal end is nearer the second edge of the portable computing device and wherein the first tertiary bar and the second tertiary bar are perpendicular to the primary bar and to the secondary bar, wherein the first tertiary bar and the second tertiary bar are moveable along a perpendicular axis between the first tertiary bar and the second tertiary bar and wherein a combination of the primary bar, the secondary bar, the first tertiary bar and the second tertiary bar are configured to form a rectangular bounding box for containing one or more portable devices; and a set of slide slats spanning a distance between the primary bar and to the secondary bar, wherein each slat is parallel to and spaced apart from an adjacent slat in the set of slide slats and wherein the set of slide slats are located overhead of the one or more portable devices to contain the one or more portable devices within the bounding box.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, or an embodiment combining software (including firmware, resident software, micro-code, etc.) and hardware aspects that may all generally be referred to herein as a "circuit," "module," or "system." Furthermore, aspects of the present invention including firmware, resident software, micro-code, etc. may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
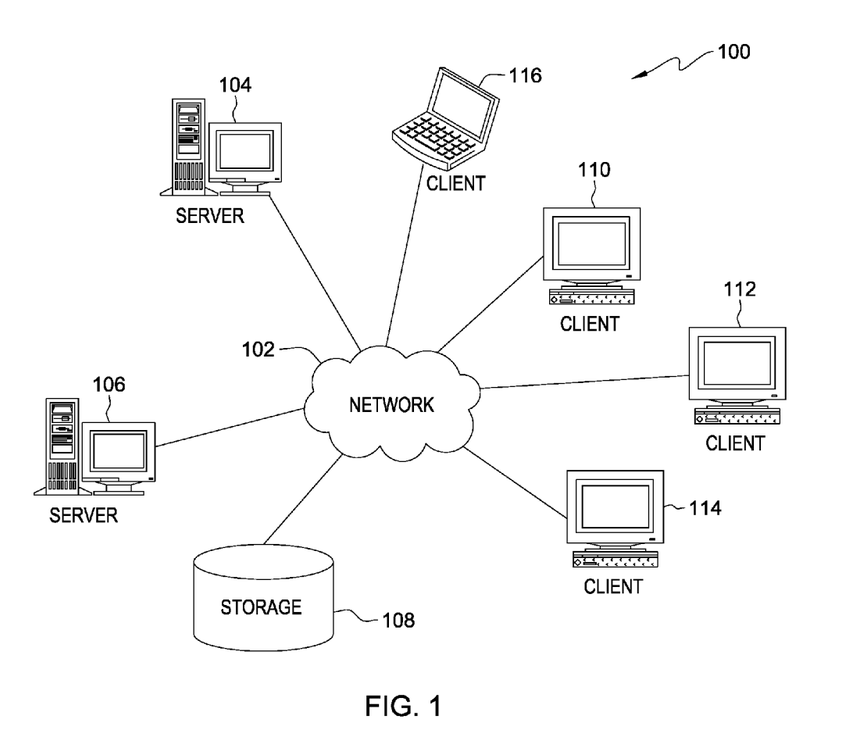
FIG. 1 is a block diagram of an exemplary network data processing system operable for various embodiments of the disclosure.
Figure 2:
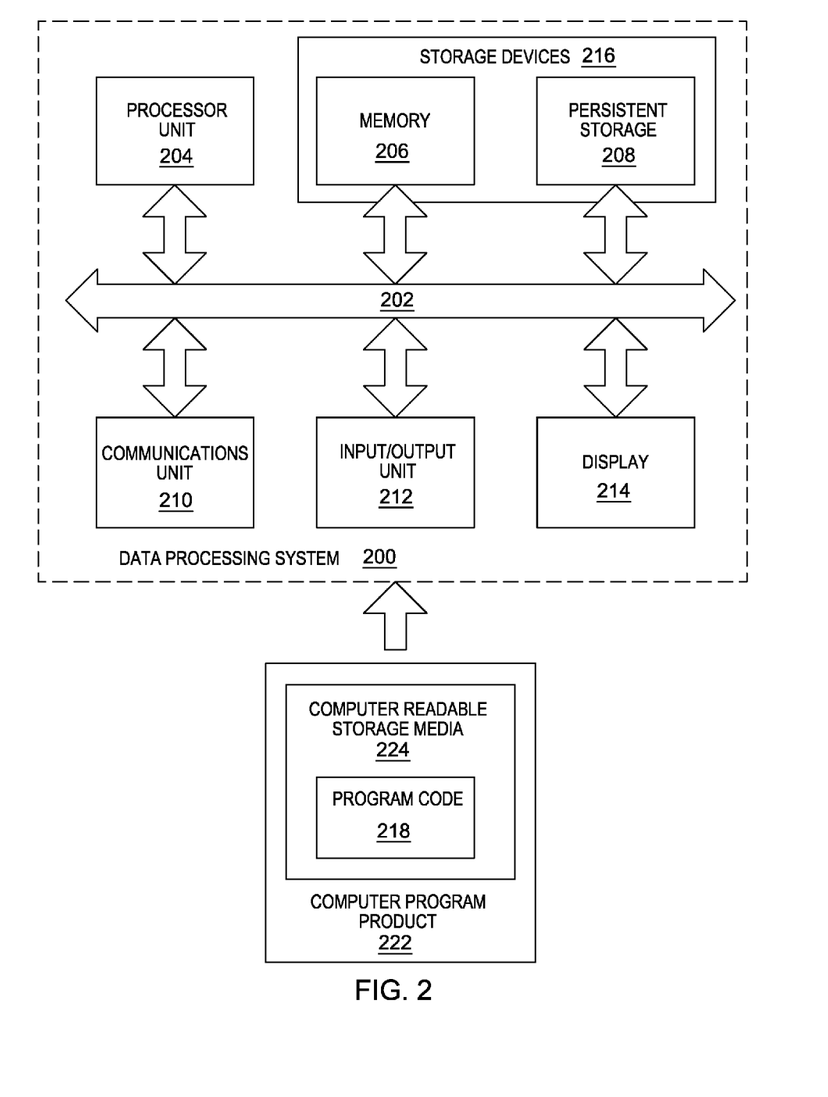
FIG. 2 is a block diagram of an exemplary data processing system operable for various embodiments of the disclosure.

With reference now to the Figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, 114, and 116 connect to network 102. Clients 110, 112, 114 and 116 may be, for example, personal computers or network computers. In the depicted example, server 104 provides data, such as boot files, operating system images, and applications to clients 110, 112, 114 and 116. Clients 110, 112, 114 and 116 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. In other embodiments, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2, a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Further, input/output unit 212 may provide connectivity enabling attachment of portable devices, including portable storage devices including a thumb drive, or a flash memory and other specialized peripherals. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 224 that is selectively removable and may be loaded onto or transferred to data processing system 200 for execution by processor unit 204. Program code 218 and computer readable storage media 224 form computer program product 222 in these examples. In one example, computer readable storage media 224 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 224 also may take the form of a persistent storage, such as a hard drive, the thumb drive, or the flash memory that is connected to data processing system 200. The tangible form of computer readable storage media 224 is also referred to as computer recordable storage media. In some instances, computer readable storage media 224 may not be removable.

Alternatively, program code 218 may be transferred to data processing system 200 from computer readable storage media 224 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

An embodiment of a device attachment framework for capturing a set of portable devices is presented. The apparatus comprises a primary bar affixed to a surface of a portable computing device adjacent and parallel to a first edge of the computing device; a secondary bar parallel to and spaced apart from the primary bar, wherein the secondary bar is moveable in a linear distance relative to the primary bar; a first tertiary bar, wherein a first end abuts the primary bar and a distal end is nearer a second edge of the portable computing device; a second tertiary bar, wherein the second tertiary bar is parallel to and spaced apart from the first tertiary bar, wherein a first end of the second tertiary bar abuts the primary bar and a distal end is nearer the second edge of the portable computing device and wherein the first tertiary bar and the second tertiary bar are perpendicular to the primary bar and to the secondary bar, wherein the first tertiary bar and the second tertiary bar are moveable along a perpendicular axis between the first tertiary bar and the second tertiary bar and wherein a combination of the primary bar, the secondary bar, the first tertiary bar and the second tertiary bar are configured to form a rectangular bounding box for containing one or more portable devices; and a set of slide slats spanning a distance between the primary bar and to the secondary bar, wherein each slat is parallel to and spaced apart from an adjacent slat in the set of slide slats and wherein the set of slide slats are located overhead of the one or more portable devices to capture the one or more portable devices within the bounding box.

Figure 3:
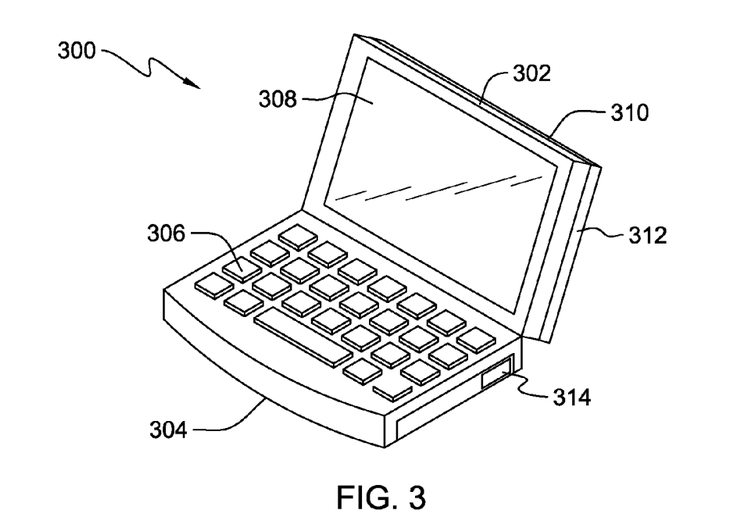
FIG. 3 is a pictorial diagram of an exemplary data processing device operable for various embodiments of the disclosure.

With reference to FIG. 3, a pictorial representation of a device attachment framework operable for various embodiments of the disclosure is presented. Client 116 of network data processing system 100 of FIG. 1 represents use of computing device 300 comprising typical components of top portion 302, base portion 304, keyboard 306, screen 308, top surface 310 and device connector 314. Top portion 302 is attached to base portion 304 with a hinge mechanism permitting top portion 302 to be moved between a closed position and an open position. In the closed position top portion 302 rests against base portion 304 covering keyboard 306 and protecting screen 308. In the open position keyboard 306 is accessible for use and a user may adjust screen 308 through a range of positions to suit viewing.

Device attachment framework 312 is affixed to top surface 310 of laptop computing device 300, providing a capability of attaching portable storage devices for use with the computing device. As shown computing device 300 represents a typical laptop computer. Other similar devices, such a tablet computer may also be used with a suitably dimensioned device attachment framework 312. A portion of device attachment framework 312 is typically affixed along an edge of top portion 302 nearest the hinge mechanism.

Device connector 314 provides a capability of direct attachment of portable storage devices as well as other peripheral devices that are compatible with the connector style of the device attachment. For example, when device connector 314 is configured as a universal serial bus (USB) connector, devices conforming to the USB standard may be connected directly using a suitable device or indirectly by means of a cable to link to the connected device.

Device attachment framework 312 provides a capability of securely attaching one or more portable storage devices to computing device 300 for use with the computing device.

Figure 4:
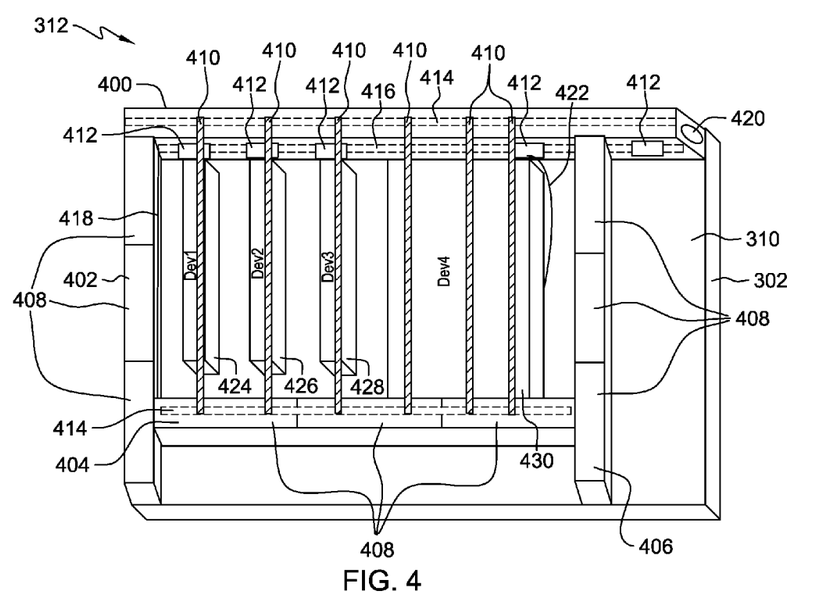
FIG. 4 is a block diagram representation of a device attachment framework operable for various embodiments of the disclosure.

With reference to FIG. 4, a block diagram of a representation of the device attachment framework of FIG. 3 in accordance with one embodiment of the disclosure is presented. Device attachment framework 312 is an example embodiment of a portable storage device capturing apparatus according to the disclosure.

Top surface 310 of top portion 302 of computing device 300 provides a foundation upon which device attachment framework 312, all of FIG. 3, is affixed. Fastening of device attachment framework 312 to top surface 310 enables portable storage devices to be secured for use with computing device 300.

Primary bar 400 of device attachment framework 312 is secured to top surface 310 to provide a firm foundation upon which other components of the device attachment framework is based. In the illustrative example, primary bar 400 is a rectangular shaped bar dimensioned to fit along the length of top surface 310 of computing device 300 of FIG. 3. Primary bar 400 can alternatively take other shapes including rounded corners, protrusions forming a set of legs and an open web formed by a set of openings through sides of the primary bar while forming a secure mating surface or surfaces with top surface 310.

A set of channels is formed within primary bar 400 to enable sliding engagement and adjustment of a set of device connectors 412 and a set of slide slats 410. Set of slide slats 410 may also be referred to as security bars. Slat channel 414 is located within a top edge of primary bar 400, wherein the top edge is a surface opposite to a surface used for mating the primary bar to the computing device. Slat channel 414 further runs a length of primary bar 400 providing opening at either end for easy addition and removal of a slat when desired for reconfiguration. Slat channel 414 is dimensioned to accept a first end of each slat in set of slide slats 410. The channel enables a slat in set of slide slats 410 to be moved to a desired location and temporarily fixed in a desired position. When in operation slats of set of slide slats 410 are positioned over and partially cover a portable storage device to prevent removal. A detail view of an illustrative embodiment of the first end of a slat in set of slide slats 410 engaged in slat channel 414 is presented in FIG. 6.

Device connector channel 416 is formed within primary bar 400 to enable sliding engagement and adjustment of a set of device connectors 412 in a linear manner throughout a length of primary bar 400. The positioning of device connector channel 416 is within an inward facing surface of primary bar 400 perpendicular to the top edge. A set of device connectors 412 is positioned in spaced apart adjustable configurations through the length of device connector channel 416 to accept a variety and number of portable storage devices, including dev1 424, dev2 426, dev3 428 and dev4 430, being used with device attachment framework 312 of FIG. 3.

In the example shown, dev1 424, dev2 426, dev3 428 are connected using a direct type of connection to respective device connectors in set of device connectors 412. Dev4 430 is connected using an indirect type of connection comprising device cable 422 to a respective device connector in set of device connectors 412. Set of device connectors 412 may be spaced apart to accommodate differing arrangements and connection requirements. In a further example, set of device connectors 412 includes more than one type of connector to accommodate differing connection requirements of portable storage devices being used.

Lock mechanism 420 is located in one end of primary bar 400 to manage components of the attachment framework between a locked position and an unlocked position. When lock mechanism 420 is in an unlocked position adjustable components of the attachment framework are permitted to be moveable, enabling configuration of the components as needed to accommodate one or more portable storage devices within. When lock mechanism 420 is in a locked position the adjustable components of the attachment framework are not permitted to be moved, thereby disabling reconfiguration and securing one or more portable storage devices within.

In an illustrative embodiment, placing lock mechanism 420 in the locked position activates one or more cam lobes to press against a respective portion of a component to prevent movement of a respective component, thereby securing one or more portable storage devices within. Other locking mechanisms, including tumblers and fingers, may be used equally well to hold fast the adjustable components to prevent movement and therefore to capture the portable storage devices within the bounding box defined in an implementation of an embodiment of device attachment framework 312 of FIG. 3

Secondary bar 404 operates parallel to and spaced apart from primary bar 400. In one embodiment secondary bar 404 includes a set of telescopic portions 408 enabling the size of secondary bar 404 to be adjusted to accommodate a range of sizes of one or more portable storage devices. In an alternative embodiment secondary bar 404 is of a fixed length wherein accommodation a range of sizes of one or more portable storage devices relies on security afforded by use of set of slide slats 410.

Each end of secondary bar 404 contains a shouldered shaft engaged within a respective bar channel 418 within an interior face of each of first tertiary bar 402 and second tertiary bar 406. While secondary bar 404 is maintained parallel to and spaced apart from primary bar 400, secondary bar 404 is also maintained perpendicular to and spaced apart from first tertiary bar 402 and second tertiary bar 406. Each end of secondary bar 404 therefore abuts a respective interior face of first tertiary bar 402 and second tertiary bar 406 to form a closed configurable bounding box for containment of one or more portable storage devices. Security is maintained through further use of set of slide slats 410 when lock mechanism 420 is engaged in a lock position.

Secondary bar 404 provides a capability to traverse along a distance defined by a dimension of bar channel 418 within the interior face of each of first tertiary bar 402 and second tertiary bar 406 to enable configurable dimensioning of a space between secondary bar 404 and primary bar 400.

Each of first tertiary bar 402 and second tertiary bar 406, in one embodiment includes a set of telescopic portions 408 enabling the size of first tertiary bar 402 and second tertiary bar 406 to be adjusted to accommodate a range of sizes of one or more portable storage devices. In an alternative embodiment each of first tertiary bar 402 and second tertiary bar 406 is of a fixed length wherein accommodation a range of sizes of one or more portable storage devices relies on security afforded by use of a combination of secondary bar 404 with set of slide slats 410. In both cases the dimension of each of first tertiary bar 402 and second tertiary bar 406 does not exceed the dimension of top surface 310 (of computing device 300 of FIG. 3).

Secondary bar 404, first tertiary bar 402 and second tertiary bar 406 and set of slide slats 410 (also referred to as overhead security bars) form a set of remaining bars, because primary bar 400 is not adjustable, which are operable to be locked using locking mechanism 420 upon placement of selected portable storage devices. Collectively the components comprise a device attachment framework or capture framework providing a capability to contain a selection of portable storage devices using a secure and configurable arrangement.

Figure 5:
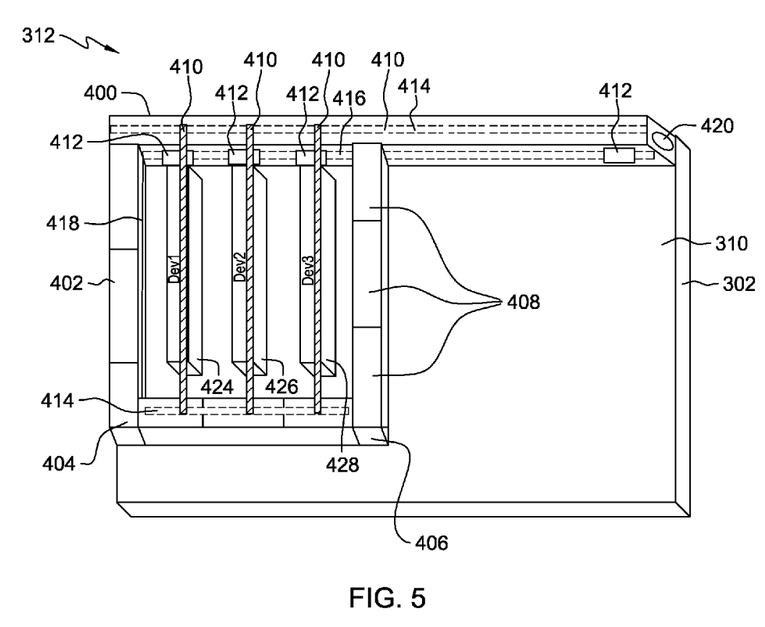
FIG. 5 is a block diagram of an alternate representation of the device attachment framework of FIG. 4 in accordance with one embodiment of the disclosure.

With reference to FIG. 5, a block diagram of an alternate representation of the device attachment framework of FIG. 3 in accordance with one embodiment of the disclosure is presented. The example depicts capture of same size portable storage devices within a configurable bounding box.

Each of first tertiary bar 402 and second tertiary bar 406, in the example embodiment uses set of telescopic portions 408 to size first tertiary bar 402 and second tertiary bar 406, all of FIG. 4, to accommodate a specific size of the portable storage devices. Further, dimensioning the tertiary bars to the size of the portable storage devices illustrates the movement of the end of each of first tertiary bar 402 and second tertiary bar 406 away from the edge of top portion 302 of FIG. 3 and toward primary bar 400 of FIG. 4.

An unused device connector remains near locking mechanism 420 of FIG. 4. Other components remain as previously described in FIG. 4.

Figure 6:
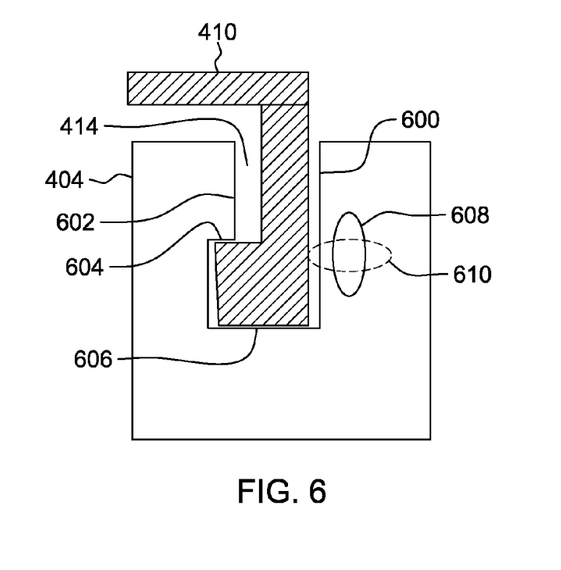
FIG. 6 is a block diagram of a channel lock mechanism of the device attachment framework of FIG. 4 in accordance with one embodiment of the disclosure.

With reference to FIG. 6, a cross section of a channel locking mechanism of the device attachment framework of FIG. 3 in accordance with one embodiment of the disclosure is presented.

In the illustration, the cross section depicts a portion of secondary bar 404 with slat channel 414 formed within, all of FIG. 4. Slat channel 414 as previously described is dimensioned to accept a first end of each slat in set of slide slats 410 of FIG. 4. The channel enables a slat in set of slide slats 410 to be moved along a length of slat channel 414 to a desired location and temporarily fixed in the desired position. Slat channel 414 in the example is shaped to accept a slat while allowing the slat to be moved linearly along the length of the channel.

When in operation slats of set of slide slats 410 are positioned over and partially cover a portable storage device to prevent removal. A first end of the slat in set of slide slats 410 is engaged in slat channel 414 between first wall 600 and second wall 602 with a portion of the slat retained under shoulder 604 and on neat bottom wall 606. The slat is urged away from first wall 600 toward second wall 602 by operation of locking mechanism 420 of FIG. 4 from an unlock position 608 to a lock position 610. In the illustrative embodiment a simple cam mechanism is used to urge the slat to be captured and retained under shoulder 604 preventing the slat from being vertically removed. Sufficient pressure is exerted against the slat to temporarily bind the slat in position as well as prevent removal. A corresponding implementation is used in primary bar 400 of FIG. 4 to capture and retain a distal end of the respective slat.

Figure 7:
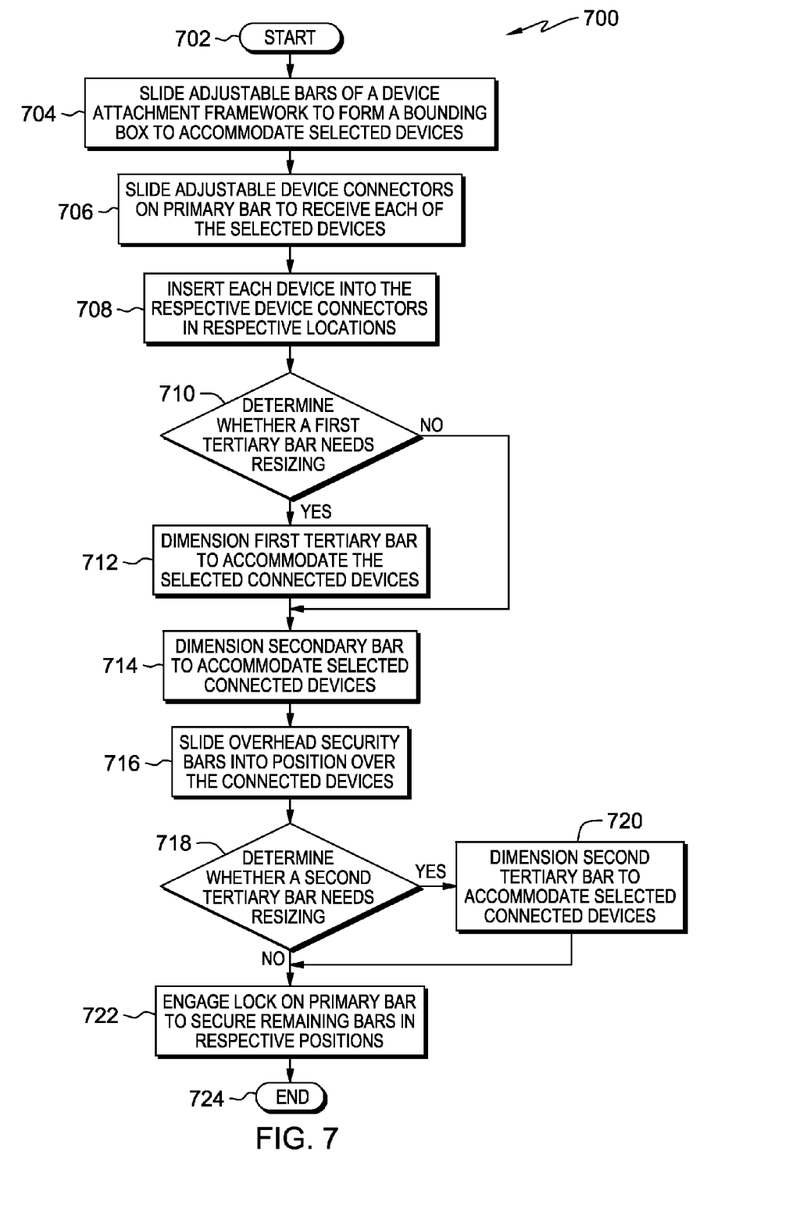
FIG. 7 is a flowchart of a process for using the device attachment framework of FIG. 4 in accordance with one embodiment of the disclosure.

With reference to FIG. 7, a flowchart of a process for capturing one or more devices in accordance with one embodiment of the disclosure is presented. Process 700 is an example of a procedure followed by a user to employ the apparatus of FIG. 4 to secure one or more portable storage devices for secure usage with a computing device of FIG. 3.

Process 700 begins (step 702) and the user slides adjustable bars of a device attachment framework to form a bounding box to accommodate selected devices (step 704). The selected devices are typically one or more portable storage devices but may also include devices of other types and purpose typically used in combination with a portable computing device including a laptop computer and tablet computer. The device attachment framework comprises a primary bar, a secondary bar parallel to and spaced apart from the primary bar and a pair of tertiary bars parallel to and spaced apart from each other, each of which is perpendicular to the primary bar and the secondary bar thereby forming a configurable bounding box for capturing one or more portable storage devices or other types of similarly sized and powered devices.

Following process 700 the user slides adjustable device connectors on a primary bar to receive each of the selected devices (step 706). The adjustable device connectors may include one or more types of connectors for the one or more portable storage devices or other device types as required in the configuration desired.

Following process 700 the user inserts each selected device into a respective device connector in a respective location (step 708). Each device connects with a corresponding device connector wherein the device connector is positioned along a channel in a primary bar. The primary bar accommodates a set of device connectors appropriate for the types of devices being used with configuration of the device attachment framework. For example, each device connector is selectively configured to accept a respective one of one or more portable devices using a connectivity configuration for the each device connector selected from a set of connectivity configurations including a universal serial bus configuration, a FireWire (IEEE 1394) configuration, Thunderbolt™, and an external serial AT attachment (eSATA) configuration, wherein each device connector configuration is independent from a next device connector configuration. Trademarks are the property of their respective owners. The configuration typically requires a specific hardware connector and a corresponding software support for the specific hardware connector.

The user determines whether a first tertiary bar needs resizing (step 710). Responsive to a determination that the first tertiary bar does not need resizing, the process moves ahead to step 714. Responsive to a determination that the first tertiary bar does need resizing, the user dimensions the first tertiary bar to accommodate the selected connected devices (step 712).

Having connected the devices to the device connections of the primary bar and positioned the devices adjacent to the first tertiary bar, the user dimensions the secondary bar to accommodate the selected connected devices (step 714). Overhead security bars are slid into position over the connected devices (step 716).

The user determines whether a second tertiary bar needs resizing (step 718). Responsive to a determination that the second tertiary bar does not need resizing, the process moves ahead to step 722. Responsive to a determination that the second tertiary bar does need resizing, the user dimensions the second tertiary bar to accommodate the selected connected devices (step 720).

Having positioned the devices adjacent to the second tertiary bar, the user engages a lock on the primary bar to secure remaining bars in respective positions (step 722) and terminates thereafter (step 724). A locking mechanism is moved to a locking position which temporarily fixes a configured spatial relationship among the remaining bars including the secondary bar and first tertiary bar and second tertiary bar as well as the set of slats (overhead security bars) to capture the one or more storage devices therein.

Thus is presented in an illustrative embodiment an apparatus for capturing a set of portable devices. The apparatus comprises a primary bar affixed to a surface of a portable computing device adjacent and parallel to a first edge of the computing device; a secondary bar parallel to and spaced apart from the primary bar, wherein the secondary bar is moveable in a linear distance relative to the primary bar; a first tertiary bar, wherein a first end abuts the primary bar and a distal end is nearer a second edge of the portable computing device; a second tertiary bar, wherein the second tertiary bar is parallel to and spaced apart from the first tertiary bar, wherein a first end of the second tertiary bar abuts the primary bar and a distal end is nearer the second edge of the portable computing device and wherein the first tertiary bar and the second tertiary bar are perpendicular to the primary bar and to the secondary bar, wherein the first tertiary bar and the second tertiary bar are moveable along a perpendicular axis between the first tertiary bar and the second tertiary bar and wherein a combination of the primary bar, the secondary bar, the first tertiary bar and the second tertiary bar are configured to form a rectangular bounding box for containing one or more portable devices; and a set of slide slats spanning a distance between the primary bar and to the secondary bar, wherein each slat is parallel to and spaced apart from an adjacent slat in the set of slide slats and wherein the set of slide slats are located overhead of the one or more portable devices to capture the one or more portable devices within the bounding box.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, or an embodiment containing both hardware and software elements. In a preferred embodiment, the invention is implemented in a combination of hardware and software, which includes but is not limited to firmware, resident software, microcode, and other software media that may be recognized by one skilled in the art. In particular the device connectivity configurations may be provided as firmware, resident software, or microcode in support of the respective device connectors of an embodiment of the apparatus.

It is important to note that while the present invention has been described in the context of a fully functioning data processing system, those of ordinary skill in the art will appreciate that the software processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. An apparatus for containing a set of portable devices, the apparatus comprising:
   a primary bar affixed to a surface of a portable computing device adjacent and parallel to a first edge of the computing device;
   a secondary bar parallel to and spaced apart from the primary bar, wherein the secondary bar is moveable in a linear distance relative to the primary bar;
   a first tertiary bar, wherein a first end abuts the primary bar and a distal end is nearer a second edge of the portable computing device;
   a second tertiary bar, wherein the second tertiary bar is parallel to and spaced apart from the first tertiary bar, wherein a first end of the second tertiary bar abuts the primary bar and a distal end is nearer the second edge of the portable computing device and wherein the first tertiary bar and the second tertiary bar are perpendicular to the primary bar and to the secondary bar, wherein the first tertiary bar and the second tertiary bar are moveable along a perpendicular axis between the first tertiary bar and the second tertiary bar and wherein a combination of the primary bar, the secondary bar, the first tertiary bar and the second tertiary bar are configured to form a rectangular bounding box for containing one or more portable devices; and a set of slide slats spanning a distance between the primary bar and to the secondary bar, wherein each slat is parallel to and spaced apart from an adjacent slat in the set of slide slats and wherein the set of slide slats are located overhead of the one or more portable devices to contain the one or more portable devices within the bounding box.

2. The apparatus of claim 1 wherein the primary bar further comprises:

a second channel along a top surface of the primary bar dimensioned to accommodate a first end of each slat in the set of slide slats;

a locking mechanism located in a first end of the primary bar, wherein the locking mechanism is operable between a lock position and an unlock position, wherein when the locking mechanism is in a lock position remaining bars are temporarily immovable containing the one or more portable devices in a secure manner to prevent removal.

3. The apparatus of claim 1 wherein the primary bar further comprises:

a second channel within an inward facing surface of the primary bar and perpendicular to a top surface of the primary bar to form a device connector channel to enable sliding engagement and adjustment of a set of device connectors in a linear manner throughout a length of the primary bar, wherein the set of device connectors is positioned in a spaced apart adjustable configuration through the length of the device connector channel and wherein each device connector is configured to accept a respective one of the one or more portable devices.

4. The apparatus of claim 1 wherein the secondary bar further comprises:

a set of telescopic portions, wherein the set of telescopic portions enables linear movement of portions in the set of telescopic portions to adjust a size of the secondary bar to accommodate a range of sizes of the one or more portable devices.

5. The apparatus of claim 1 wherein the secondary bar further comprises:

a shaft with a raised shoulder dimensioned for sliding engagement with a channel traversing a length of an inner facing wall of each of the first tertiary bar and the second tertiary bar, wherein the secondary bar is maintained perpendicular to each of the first tertiary bar and the second tertiary bar.

6. The apparatus of claim 2 wherein the locking mechanism is a cam, wherein the cam is one of a set of cam lobes spaced a length of the primary bar and a single lobe the length of the primary bar, and wherein a similar cam is located in each of the secondary bar, the first tertiary bar and the second tertiary bar, wherein the cam of the primary bar when placed in a lock position activates a corresponding cam in each remaining bar to render the remaining bars temporarily immovable containing the one or more portable devices in a secure manner to prevent removal.

7. The apparatus of claim 3 wherein the each device connector is configured to accept a respective one of the one or more portable devices further comprises:

a connectivity configuration for the each device connector selected from a set of connectivity configurations including a universal serial bus configuration, a FireWire configuration, Thunderbolt and an external serial AT attachment (eSATA) configuration, wherein the each device connector configuration is independent from a next each device connector configuration and includes corresponding software support.

* * * * *